United States Patent
Yamada (10) Patent No.: US 7,338,382 B2
(45) Date of Patent: Mar. 4, 2008

(54) EXTENDABLE VEHICLE STEERING SHAFT

(75) Inventor: Yasuhisa Yamada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 190 days.

(21) Appl. No.: 10/531,180

(22) PCT Filed: Oct. 8, 2003

(86) PCT No.: PCT/JP03/12880
§ 371 (c)(1),
(2), (4) Date: Apr. 11, 2005

(87) PCT Pub. No.: WO2004/033270
PCT Pub. Date: Apr. 22, 2004

(65) Prior Publication Data
US 2006/0068924 A1   Mar. 30, 2006

(30) Foreign Application Priority Data
Oct. 10, 2002   (JP) ............................. 2002-297533

(51) Int. Cl.
*F16C 3/035*   (2006.01)
(52) U.S. Cl. ........................................ 464/167; 384/48
(58) Field of Classification Search ................. 384/48, 384/52, 54; 464/162, 167; 74/492, 493
See application file for complete search history.

(56) References Cited

U.S. PATENT DOCUMENTS

| | | | | |
|---|---|---|---|---|
| 3,444,753 A | * | 5/1969 | Runkle | ......................... 74/493 |
| 4,500,141 A | * | 2/1985 | Daugherty | ..................... 384/52 |
| 5,709,605 A | | 1/1998 | Riefe et al. | .................... 464/83 |
| 6,557,433 B1 | * | 5/2003 | Castellon | ..................... 74/492 |
| 6,948,401 B2 | * | 9/2005 | Zernickel et al. | ............. 74/493 |
| 2006/0181069 A1 | * | 8/2006 | Yamada | .................. 464/167 X |

FOREIGN PATENT DOCUMENTS

| | | | | |
|---|---|---|---|---|
| AU | 234387 | * | 12/1959 | ................. 464/167 |
| DE | 37 30 393 | | 3/1989 | |
| DE | 202 12 294 U1 | | 10/2003 | |
| EP | 1 078 843 | | 2/2001 | |
| EP | 1 512 607 A1 | | 3/2005 | |
| EP | 1 568 569 A1 | | 8/2005 | |
| JP | U.M. 4-123775 | | 11/1992 | |
| JP | 2000-38142 | | 2/2000 | |
| JP | 2001-50293 | | 2/2001 | |
| JP | 2002-286034 | | 10/2002 | |
| SU | 398786 | * | 9/1973 | ................. 464/167 |
| WO | WO 86/07120 | * | 12/1986 | ................. 464/167 |
| WO | WO 99/08920 | | 2/1999 | |

\* cited by examiner

Primary Examiner—Greg Binda
(74) Attorney, Agent, or Firm—Miles & Stockbridge P.C.

(57) ABSTRACT

In a telescopic shaft for vehicle steering, assembled in a steering shaft of a vehicle and including a male shaft and a female shaft so fitted as to be mutually incapable of rotating but mutually slidable, at least one set of torque transmission members are disposed in at least one set of accommodating portions formed in an outer peripheral surface of the male shaft and in an inner peripheral surface of the female shaft, and at least the one set of torque transmission members are cylindrical members that gradually decrease in their diameters toward end portions in an axial direction.

11 Claims, 7 Drawing Sheets

EXTENDABLE VEHICLE STEERING SHAFT

TECHNICAL FIELD

The present invention relates to a telescopic shaft for vehicle steering, capable of actualizing a stable slide load and transmitting torque in a high-rigidity state by surely preventing backlash.

BACKGROUND ARTS

Figure 7:
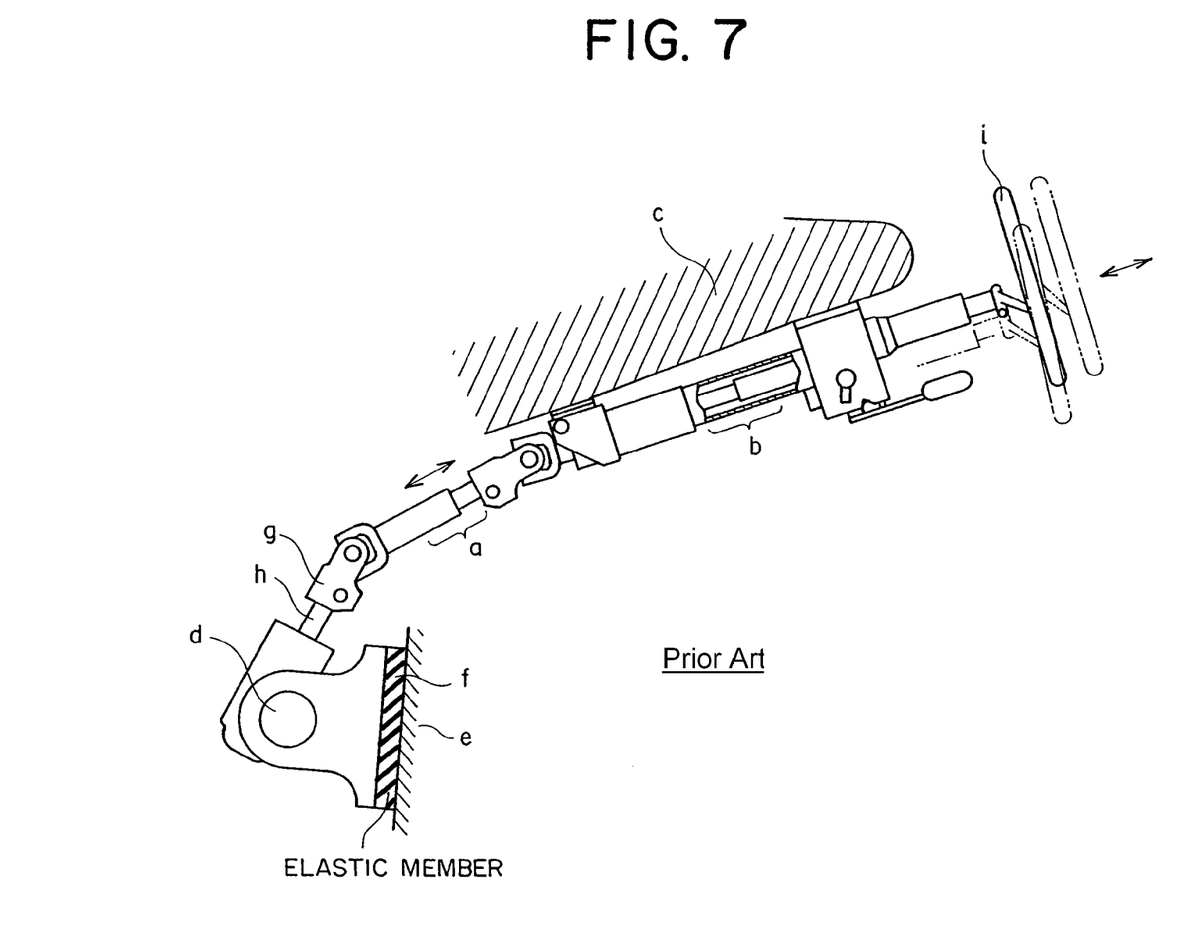
FIG. 7 is a side view of a general type of steering mechanism of an automobile.

FIG. 7 shows a general type of steering mechanism of an automobile. In FIG. 7, the symbols a and b represent telescopic shafts. The telescopic shaft a is constructed by spline-fitting a male shaft and a female shaft to each other. This type of telescopic shaft is, however, required to have performance that absorbs an axis-directional displacement occurred when the automobile travels but transmits neither the displacement nor vibrations onto a steering wheel. This performance is required generally in such a structure that a vehicle body takes a sub-frame structure, a portion c for fixing an upper portion of the steering mechanism and a frame e to which a steering rack d is fixed are different units, and the frame e and the steering rack d are fixed by fastening through an elastic member f such as rubber interposed therebetween. Further, there is other case in which a worker, when fastening a steering shaft joint g to a pinion shaft h, temporarily contracts the telescopic shaft and thereafter fits and fastens the joint g to the pinion shaft h, and therefore a telescopic function is needed. Moreover, the telescopic shaft b provided in the upper portion of the steering mechanism is also constructed by spline-fitting the male shaft and the female shaft to each other. This type of telescopic shaft b is required to have a function of shifting a position of a steering wheel i in the axial direction in order to obtain an optimal position when a driver drives the car and adjusting this position, and hence an axis-directional telescoping function is requested of this shaft. In all cases described above, the telescopic shaft is requested to reduce backlash noises at the spline-fitting portion, a feeling of backlash on the steering wheel and a slide resistance when sliding in the axial direction.

Such being the case, according to European Patent Application Laid-Open Publication No. EP1078843A1, plural sets of torque transmission members (cylindrical members) are fitted in plural sets of axis-directional grooves formed in an outer peripheral surface of the male shaft and in an inner peripheral surface of the female shaft.

Each set of torque transmission members (the cylindrical members) are constructed of a plurality of needle rollers arranged side by side in the axial direction.

With this arrangement, when the torque is not transmitted, the backlash between the male shaft and the female shaft can be prevented, whereby the male shaft and the female shaft can slide in the axial direction with a stable slide load without any backlash. Further, when transmitting the torque, the male shaft and the female shaft can transmit the torque in a high-rigidity state by preventing the backlash in a rotating direction.

According to European Patent Application Laid-Open Publication No. EP1078843A1, however, each set of torque transmission members (the cylindrical members) are constructed of the plurality of needle rollers arranged side by side in the axial direction, and therefore, the assembly is complicated enough to take an excessive period of assembling time.

Accordingly, if the number of the needle rollers in each row is set to one or two, accuracy of straightness of each of the male shaft and the female shaft must be enhanced. This inevitably involves machining the grooved portions and induces a rise in manufacturing cost. Hence, enhanced performance (which reduces the backlash in the peripheral direction while restraining the slide resistance low) and a decrease in cost can not be compatible.

Moreover, if the accuracy of straightness of each of the male shaft and the female shaft is not enhanced, a high surface pressure might occur in the vicinity of an end face of the needle roller when transmitting the torque.

DISCLOSURE OF THE INVENTION

The present invention, which was devised under such circumstances, aims at providing a telescopic shaft for vehicle steering, capable of actualizing a stable slide load, transmitting torque in a high-rigidity state by surely preventing backlash in a rotating direction and, besides, increasing a lifetime by decreasing both a period of assembling time of a torque transmission member and a surface pressure of the torque transmission member while restraining the backlash in a peripheral direction. To accomplish the above object, in a telescopic shaft for vehicle steering, assembled in a steering shaft of a vehicle and including a male shaft and a female shaft so fitted as to be mutually incapable of rotating but mutually slidable, an improvement is characterized in that at least one set of torque transmission members are disposed in at least one set of accommodating portions formed in an outer peripheral surface of the male shaft and in an inner peripheral surface of the female shaft, and at least one set of torque transmission members are cylindrical members that gradually decrease in their diameters toward end portions in an axial direction.

Thus, according to the present invention, at least one set of torque transmission members are the cylindrical members that gradually decrease in their diameters toward the end portions in the axial direction, and hence the cylindrical members of which the number is as small as possible can be disposed in one row of accommodating portions (the axis-directional grooves). Accordingly, the assembling time can be reduced, and the cylindrical member can be manufactured at a low cost. Further, at least one set of torque transmission members are the cylindrical members that gradually decrease in their diameters toward the end portions in the axial direction, and therefore the backlash in the peripheral direction can be reduced while restraining the slide resistance low.

Moreover, in the telescopic shaft for vehicle steering according to the present invention, it is preferable that at least one set of torque transmission members are cylindrical members subjected to crowning. With this construction, at least one set of torque transmission members are the cylindrical members subjected to the crowning, and therefore the cylindrical members of which the number is as small as possible can be disposed in one row of accommodating portions (the axis-directional grooves).

Accordingly, the assembling time can be reduced, and the cylindrical member can be manufactured at the low cost.

The torque transmission member is the cylindrical member subjected to the crowning, and hence the backlash in the peripheral direction can be reduced while restraining the slide resistance low.

Further, as the torque transmission member is the cylindrical member subjected to the crowning, when the torque is loaded, a gentle surface pressure is applied toward a central portion from the end portion of the cylindrical member, and a local surface pressure can be thus avoided, so that a lifetime of the product can be kept long.

Moreover, in the telescopic shaft for vehicle steering according to the present invention, it is preferable at least one set of torque transmission members are cylindrical members of which outside diameters vicinal to the end portions are worked in a tapered configuration. With this construction, when the torque is loaded, the gentle surface pressure is applied toward the central portion from the end portion of the cylindrical member, and the local surface pressure can be thus avoided, so that the lifetime of the product can be kept long. In the telescopic shaft for vehicle steering according to the present invention, it is preferable that the cylindrical member is a needle roller.

BEST MODE FOR CARRYING OUT THE INVENTION

A telescopic shaft for vehicle steering according to an embodiment of the present invention will hereinafter be described with reference to the drawings.

Figure 1:
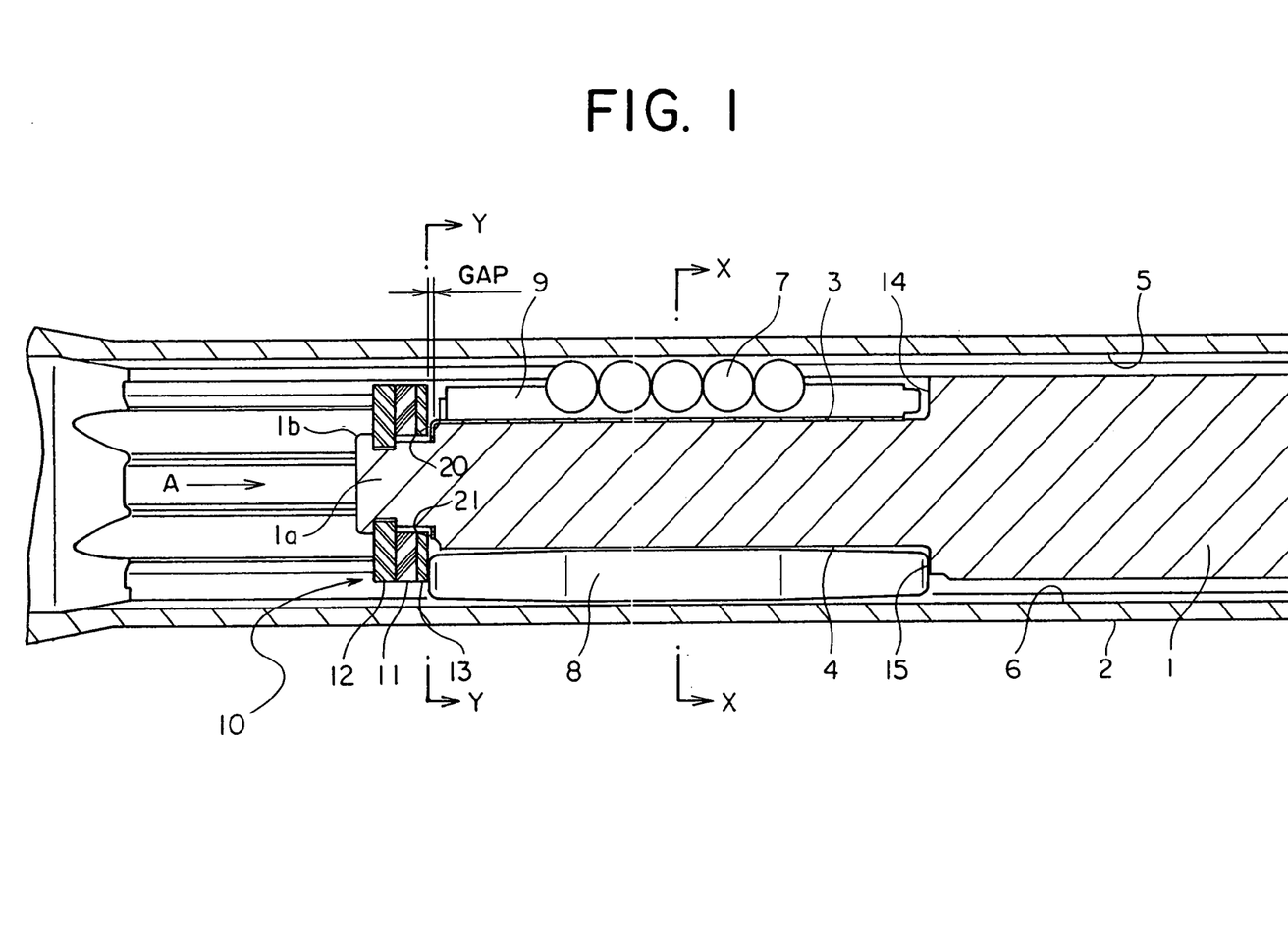
FIG. 1 is a vertical sectional view of a telescopic shaft of vehicle steering according to an embodiment of the present invention.
Figure 2:
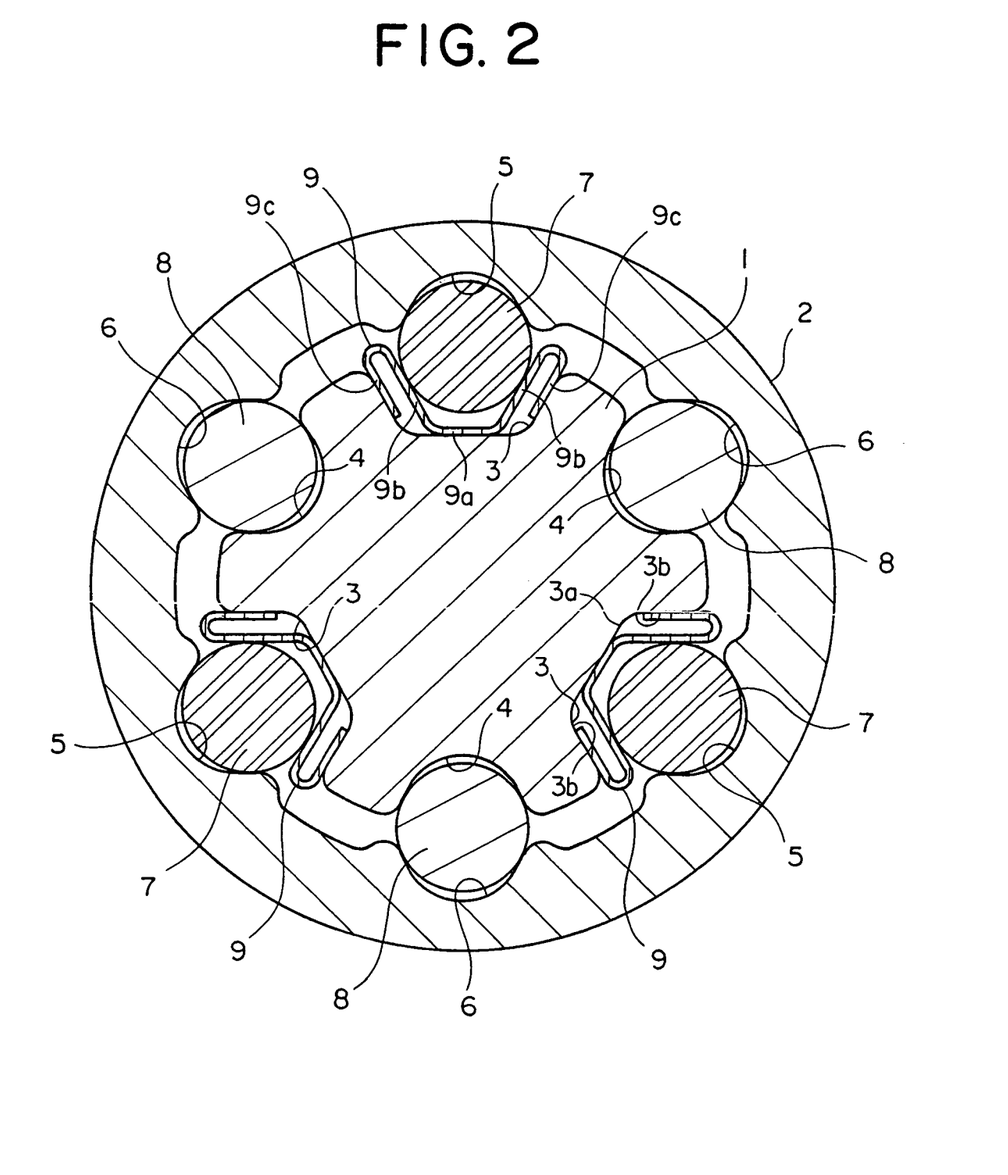
FIG. 2 is a cross-sectional view taken along the line X-X in FIG. 1.

FIG. 1 is a longitudinal sectional view showing the telescopic shaft for the vehicle steering according to the embodiment of the present invention. FIG. 2 is a cross-sectional view taken along the line X-X in FIG. 1.

As illustrated in FIG. 1, the telescopic shaft for the vehicle steering (which will hereinafter simply be termed the telescopic shaft) is constructed of a male shaft 1 and a female shaft 2 that are so fitted as to be mutually incapable of rotating but mutually slidable.

As shown in FIG. 2, an outer peripheral surface of the male shaft 1 is formed with three lines of grooves 3 equally disposed at an interval of 120 degrees in a peripheral direction and extending in an axial direction. Each groove 3, as apparent in FIG. 2, in its cross-sectional configuration, has a flat bottom portion 3a at the center and flat side portions 3b, 3b inclined divergently extending from both ends of the bottom portion 3a toward the outside-diametrical sides. Further, the outer peripheral surface of this male shaft 1 is formed with three lines of grooves 4 taking substantially a circular-arc shape in section, disposed equally at an interval of 120 degrees in the peripheral direction and extending in the axial direction in periphery-directional areas between these three grooves 3 extending in the axial direction.

An inner peripheral surface of the female shaft 2 is formed with three lines of grooves 5 taking substantially a circular-arc shape in section, disposed equally at the interval of 120 degrees in the peripheral direction and extending in the axial direction. Moreover, the inner peripheral surface of this female shaft 2 is formed with three lines of grooves 6 taking substantially a circular-arc shape, disposed equally at the interval of 120 degrees in the peripheral direction and extending in the axial direction in periphery-directional areas between these three grooves 5 extending in the axial direction.

The grooves 3, 5 extending in the axial direction configure three sets of first accommodating portions for three sets of spherical members 7 that will be explained later on, and the grooves 4, 6 extending in the axial direction configure three sets of second accommodating portions for three sets of cylindrical members 8 that will hereinafter be described. These three sets of axis-directional grooves 3, 5 (the first accommodating portions) and the three sets of axis-directional grooves 4, 6 (the second accommodating portions), are arranged alternately in the peripheral direction, wherein the grooves adjacent to each other are disposed equally at an interval of 60 degrees in the peripheral direction.

A first torque transmission device is constructed so that three sets of first torque transmission members (spherical members) 7 for transmitting torque in a way of their rolling when making relative movements in the axial direction between the male shaft 1 and the female shaft 2 and of their being restricted by plate springs 9 when rotating, are so accommodated as to be rollable between the three axis-directional grooves 3 of the male shaft 1 and the three axis-directional grooves 5 of the female shaft 2 through three pieces of elastic members (the plate springs) 9 each taking a corrugated shape for pre-load. Each of the first torque transmission members 7 is constructed of a spherical member.

A second torque transmission device is constructed so that three sets of second torque transmission members (cylindrical members) 8 for transmitting the torque in a way that each permits the axis-directional relative movements of the male shaft 1 and the female shaft 2 and transmits the torque when rotating, are so accommodated as to be slidable between the three grooves 4, extending in the axial direction, of the male shaft 1 and the three grooves 6, extending in the axial direction of the female shaft 2. Each of the second torque transmission members 8 is constructed of a cylindrical member extending in the axial direction.

The plate spring 9 extends in the axial direction over substantially an entire length of the groove 3 within the groove 3 of the male shaft 1, and is provided between the spherical member 7 and the groove-forming surface. The plate spring 9, when in a non-transmission state of the torque, gives the pre-load to the spherical member 7 and to the cylindrical member 8 against the female shaft 2 to such a degree as not to cause backlash, and, when transmitting the torque, works to restrict the spherical member 7 in the peripheral direction between the male shaft 1 and the female shaft 2 in a way that makes its elastic deformation.

In the thus-constructed telescopic shaft, the spherical members 7 and the cylindrical members 8 are accommodated between the male shaft 1 and the female shaft 2, and the plate springs 9 give the pre-load to the spherical members 7 and the cylindrical members 8 against the female shaft 2 to such a degree as not to cause the backlash. It is therefore possible to surely prevent the backlash between the male shaft 1 and the female shaft 2 when transmitting none of the torque, and, when the male shaft 1 and the female shaft 2 make the relative movement in the axial direction, the male shaft 1 and the female shaft 2 can slide in the axial direction with a stable slide load without causing the backlash.

Note that if the slide face is formed solely for sliding as by the prior art, the pre-load for preventing the backlash could only be retained down to a certain load. This is because the slide load is given by multiplying a frictional coefficient by the pre-load, and, if the pre-load is increased in the anticipation that the prevention of the backlash and rigidity of the telescopic shaft be improved, the slide load rises, thus falling into a vicious circle.

In this respect, the present embodiment adopts a rolling-based mechanism partially, and hence the pre-load can be increased without inducing an outstanding rise in the slide load. Both of the prevention of the backlash and the improvement of the rigidity, which could not be attained by the prior arts, can be thereby attained without bringing about the rise in the slide load.

When transmitting the torque, the three sets of plate springs 9 perform a role of restricting, while getting elastically deformed, the three sets of spherical members 7 in the peripheral direction between the male shaft 1 and the female shaft 2, and the three sets of cylindrical members 8 accommodated between the male shaft 1 and the female shaft 2 perform a role of mainly transmitting the torque.

For example, when the torque is inputted from the male shaft 1, at an initial stage, no backlash is caused due to the pre-load of the plate springs 9, and the plate springs 9 produce reaction to the torque, thus transmitting the torque. At this time, the torque is transmitted on the whole in a state where a torque transmission load among the male shaft 1, the plate springs 9, the spherical members 7 and the female shaft 1 is equilibrated with a torque transmission load among the male shaft 1, the cylindrical members 8 and the female shaft 2.

Further, as a gap in the rotating direction between the male shaft 1 and the female shaft 2 through the cylindrical member 8 is set smaller than a gap between the male shaft 1, the plate spring 9, the spherical member 7 and the female shaft 2 through the spherical member 7, when the torque increases, the cylindrical members 8 receives the reaction stronger than the spherical members 7, and mainly the cylindrical members 8 transmit the torque to the female shaft 2. It is therefore possible to surely prevent the backlash in the rotating direction between the male shaft 1 and the female shaft 2 and to transmit the torque in a state of exhibiting the high rigidity.

Note that the spherical member 7 may be a ball. Further, the cylindrical member 8 may be a needle roller.

The needle roller 8 receives the load in line contact and is therefore capable of restraining a contact pressure lower than by the ball 7 receiving the load in point contact, and has a variety of effects as such. Accordingly, adopting the needle roller 8 is superior in terms of the following items to a case of applying a ball rolling structure to all the rows.

A damping capacity effect at the slide portion is larger than by the ball rolling structure. Hence, high vibration absorption performance is gained.

If the same torque is transmitted, the needle roller can restrain the contact pressure lower, whereby an axis-directional length can be decreased, and the space can be effectively utilized.

If the same torque is transmitted, the needle roller can restrain the contact pressure lower, thereby eliminating the necessity for an additional step of hardening the axis-directional groove surface of the female shaft by a thermal treatment and so on.

The number of components can be decreased.

An assembling property can be improved.

An assembling cost can be restrained.

Thus, the needle roller 8 performs a key role for transmitting the torque between the male shaft 1 and the female shaft 2, and comes into slide-contact with an inner peripheral face of the female shaft 2. The needle roller 8 has the following excellent points as compared with the conventional spline-fitting.

The needle roller is mass-produced and is therefore extremely low of cost.

The needle roller is polished after being subjected to the thermal treatment and has therefore high surface hardness and an excellent anti-abrasion property.

As the needle roller is polished, its surface roughness is fine enough to decrease the frictional coefficient when sliding, whereby the slide load can be restrained low.

A length and an arrangement of the needle roller can be changed corresponding to a using condition, so that it is feasible to adapt to a variety of applications without changing a design concept.

There might be a case in which the frictional coefficient at the sliding must be further decreased depending on the using condition. At this time, the slide characteristic thereof can be altered simply by effecting the surface treatment only on the needle roller, and hence it is possible to adapt to the variety of applications without changing the design concept.

The needle rollers with different outside diameters can be manufactured on a several micron basis at a low cost, and therefore the gap between the male shaft, the needle roller and the female shaft can be restrained down to the minimum by selecting a diameter of the needle roller. Hence, improvement of the shaft rigidity in a torsional direction is facilitated.

On the other hand, a structural point of partly adopting the balls has the following excellent items as compared with the structure in which the needle rollers are arranged in all the rows, and all the rows of needle rollers are slidable.

The frictional coefficient is low, and hence the slide load is restrained low.

The pre-load can be increased, and the prevention of the backlash over a long period of time and the high rigidity can be attained simultaneously.

Figure 3:
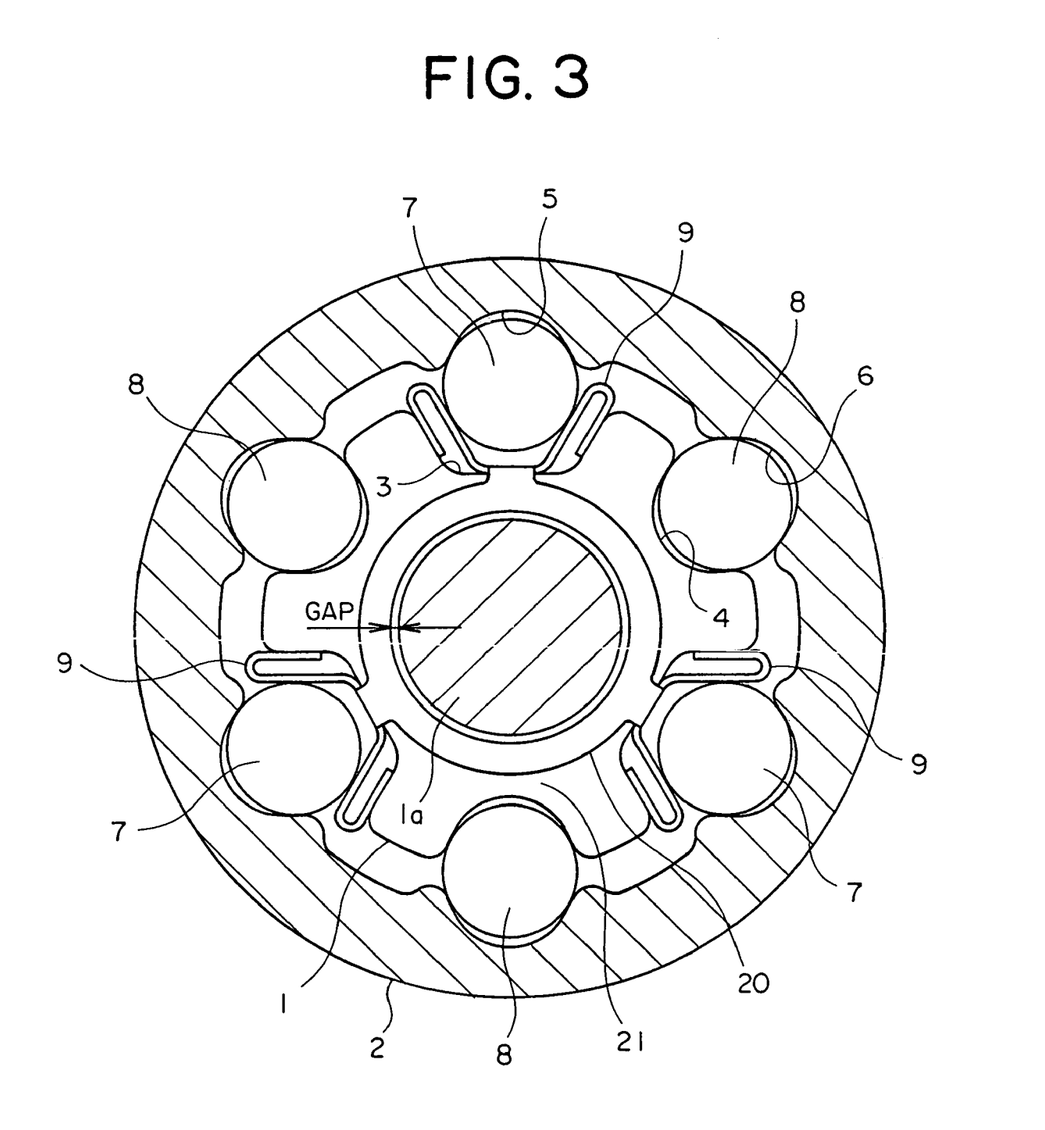
FIG. 3 is a cross-sectional view taken along the line Y-Y in FIG. 1.
Figure 4:
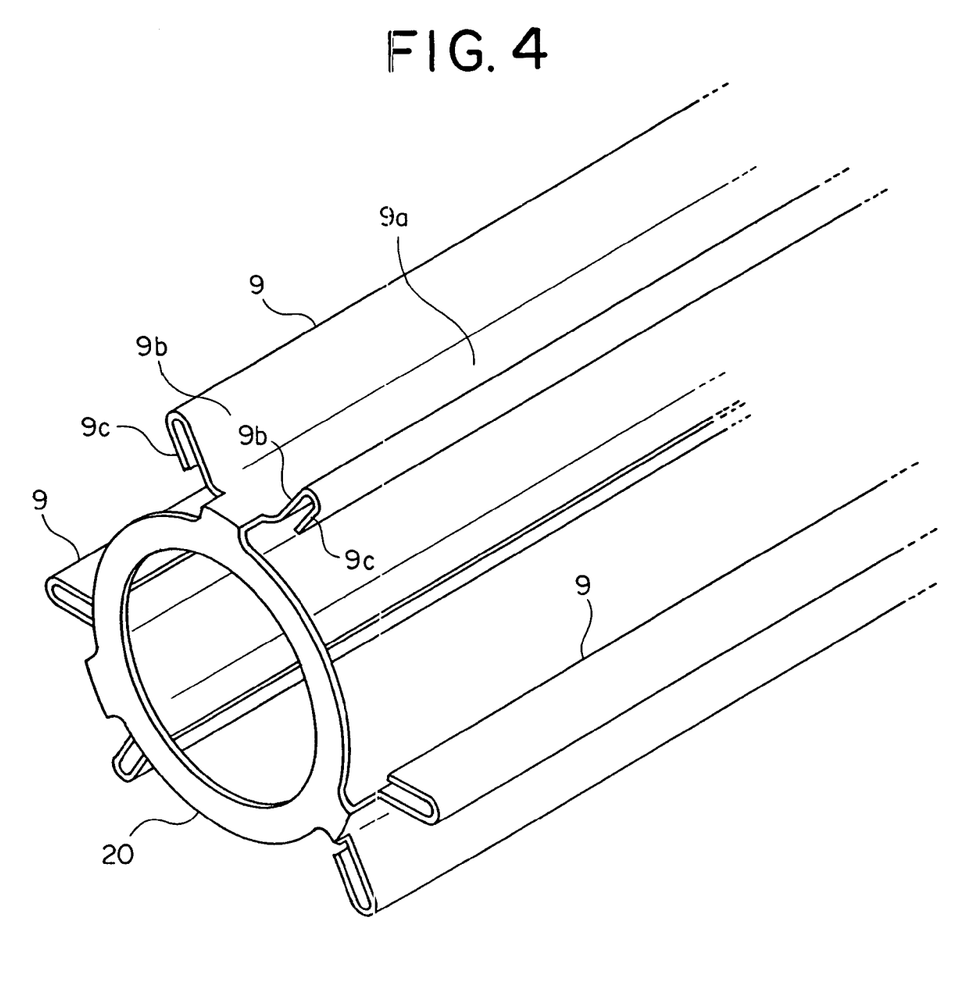
FIG. 4 is a perspective view of an elastic member (plate spring) connected by a connecting portion.
Figure 5:
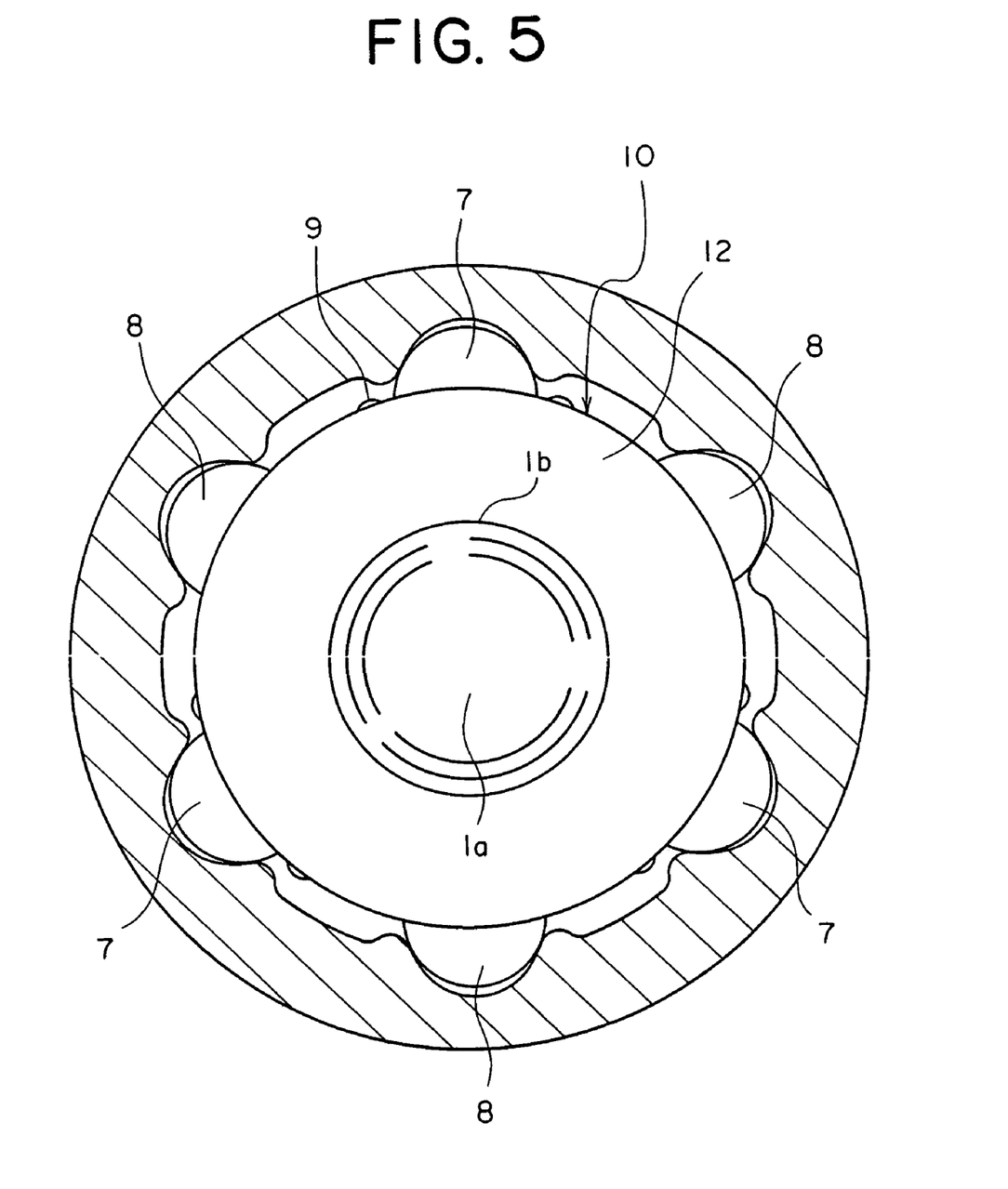
FIG. 5 is a view in the direction of an arrow A in FIG. 1.

FIG. 3 is a cross-sectional view taken along the line Y-Y in FIG. 1. FIG. 4 is a perspective view of the elastic members (the plate springs) connected by connecting portions. FIG. 5 is a view in the direction of an arrow A shown in FIG. 1.

As shown in FIG. 1, an end portion of the male shaft 1 is formed with a small-diameter portion 1a. This small-diameter portion 1a is provided with a stopper plate 10 for regulating an axis-directional movement of the needle roller 8. This stopper plate 10 is constructed of an elastic member 11 for an axis-directional preload, and a pair of flat plates 12, 13 by which this axis-directional pre-load elastic member 11 is pinched.

Namely, according to the present embodiment, the flat plate 13, the axis-directional pre-load elastic member 11 and the flat plate 12 are fitted in this sequence on the small-diameter portion 1a, and subsequently the end portion 1b of the small-diameter portion 1a is caulked (or clinched), thus firmly fixing the stopper plate 10 to the small-diameter portion.

Note that a method of fixing the stopper plate 10 is not limited to caulking (or clinching) and may involve using a locating snap ring, a screw-fitting means, a bush nut and so on.

With this arrangement, the stopper plate 10 is constructed so that the flat plate 13 abuts on the needle rollers 8, and a proper pre-load can be given to the needle rollers 8 from the axis-directional pre-load elastic members 11 so as not to move in the axial direction.

The axis-directional pre-load elastic member 11 is made of rubber, resin or constructed of a plate spring made of steel sheet, and so forth. The axis-directional pre-load elastic member 11 may be separated from the flat plates 12, 13, however, it is preferable that the axis-directional pre-load elastic member 11 and the flat plates 12, 13 be structured as an integral molding product in terms of considering easiness of the assembly.

For example, when the axis-directional pre-load elastic member 11 is manufactured by use of the rubber, and, if manufactured by vulcanization-molding of the flat plates 12, 13, the integration thereof can be attained, whereby an easy-to-assemble and low-cost product can be manufactured.

Further, when the axis-directional pre-load elastic member 11 is manufactured by using the resin, the integration can be attained by effecting the integral molding of a corrugated elastic member 11 with the flat plates 12, 13, wherein the same merit is obtained.

Moreover, the flat plates 12, 13 involve using the steel sheets, the resin or the steel sheets formed with a film of resin.

Furthermore, the grooves 3, 4, extending in the axial direction, of the male shaft 1 are terminated at axis-directional right-angled faces 14, 15 substantially orthogonal to the axial direction and abutting on the ball 7 and the needle roller 8.

As described above, the axis-directional movement, one its one side, of the needle roller 8 is regulated by the stopper plate 10 provided at the small-diameter portion 1a of the male shaft 1, while, on the other side, the axis-directional movement of the needle roller is regulated by its abutting on the axis-directional right-angled face 15.

Further, in the stopper plate 10, the flat plate 13 abuts on the needle roller 8, whereby the axis-directional pre-load elastic member 11 gives a proper pre-load to the needle roller 8 so as not to move in the axial direction.

Accordingly, the fixation can be attained without any gap in the axial direction by giving the proper pre-load to the needle roller 8. When the male shaft 1 and the female shaft 2 slide on each other, the needle roller is by no means moved in the axial direction, and an emission of uncomfortable noises such as a butting sound can be surely prevented.

Moreover, the axis-directional grooves 3, 4 of the male shaft 1 have the axis-directional right-angled faces 14, 15 substantially orthogonal to the axial direction and abutting on the ball 7 and the needle roller 8. Therefore, with these axis-directional right-angled faces 14, 15, the axis-directional movements of the ball 7 and the needle roller 8 can be regulated without providing special members. Consequently, the manufacturing cost can be reduced by decreasing the number of components, and besides it is possible to decrease a weight and to gain a compact configuration because of using none of the special members.

Next, according to the present embodiment, as shown in FIGS. 1, 3 and 4, the three pieces of plate springs 9 for giving the pre-load to the three sets of balls 7 are connected by a ring-shaped connecting portion 20. To be specific, as shown in FIG. 1, the small-diameter portion 1a of the end portion of the male shaft 1 is formed with a stepped annular face 21. The ring-shaped connecting portion 20 is fitted on the small-diameter portion 1a and is disposed along the stepped annular face 21.

The stepped annular face 21 may take any configuration, etc on condition that the annular face 21 is an axis-directional annular face that faces in the axial direction of the male shaft 1.

The ring-shaped connecting portion 20 connects at three peripheral edge points thereof to the axis-directional ends of the three plate springs 9. Namely, as shown in FIG. 4, the ring-shaped connecting portion 20 is constructed integrally with the three plate springs 9 extending in the axial direction. The three plate springs 9 may be different members.

Accordingly, though taking the complex structure of the balls 7 and the needle rollers 8, the three plate springs 9 serving as the rolling faces are made integral, whereby the manufacturing cost can be reduced by decreasing the number of the substantial components down to one from three, the decrease in the number of the components can be thus attained, and the assembling time is reduced by improving the assembling property.

Moreover, the ring-shaped connecting portion 20 is not the circular-arc connecting portion extending the peripheral direction as in the prior art, and can be therefore formed in the compact configuration without expanding the diameter of the female shaft 2 in its diametrical direction.

Still further, the small diameter portion 1a formed at the end portion of the male shaft 1 penetrates the ring-shaped connecting portion 20. Accordingly, when assembling the three plate springs 9, the small diameter portion 1a of the end portion of the male shaft 1 is inserted through the ring-shaped connecting portion 20, and thus performs a function as a guide at this assembling time, thereby making it possible to facilitate the assembling work and to reduce the manufacturing cost by reducing the assembling time.

Yet further, the ring-shaped connecting portion 20 is disposed in the axis-directional gap between the flat plate 13 of the stopper plate 10 and the stepped annular face 21. This axis-directional gap is set on the order of, e.g., 0.3 mm through 2.0 mm.

Owing to existence of this axis-directional gap, the ring-shaped connecting portion 20 is, even when the three plate springs 9 get deformed by an input of the torque, contrived not to restrict these motions of the plate springs 9.

Moreover, as shown in FIGS. 3 and 4, each of the plate springs 9 is formed in its sectional configuration taking a rectilinear shape that is substantially parallel with the configuration of the axis-directional groove 3 of the male shaft 1. The plate spring 9 is constructed of a flat bottom portion 9a at the center, first inclined side face portions 9b, 9b extending divergently toward its outside diameter from both ends in the cross-sectional direction of the shaft with respect to the flat bottom portion 9a, and second inclined face portions 9c, 9c folded outward on the outermost diametrical sides of the first inclined face portions 9b, 9b and extending substantially in parallel with the first inclined face portions 9b, 9b. A peripheral edge portion of the ring-shaped connecting portion 20 is connected to the flat bottom portion 9a of the central portion of each plate spring 9. The flat bottom portion 9a of each plate spring 9 is press-fitted to the flat bottom portion 3a of the groove 3, the second side face portions 9c, 9c are press-fitted to the flat side face portions 3b, 3b of the groove 3, and the first side plate portions 9b, 9b press the balls 7 and the needle rollers 8 against the side faces of the grooves 5, 6 of the female shaft 2.

The small-diameter portion 1a formed at the end portion of the male shaft 1 penetrates the ring-shaped connecting portion 20. A diameter-directional gap is formed between the small-diameter portion 1a of the male shaft 1 and the ring-shaped connecting portion 20. This diameter-directional gap is on the order of, e.g., 0.2 mm through 1.0 mm. As in the case of the axis-directional gap, owing to existence of this diameter-directional gap, the ring-shaped connecting portion 20 is, even when the three plate springs 9 get deformed by the input of the torque, contrived not to restrict these motions of the plate springs 9.

Figure 6:
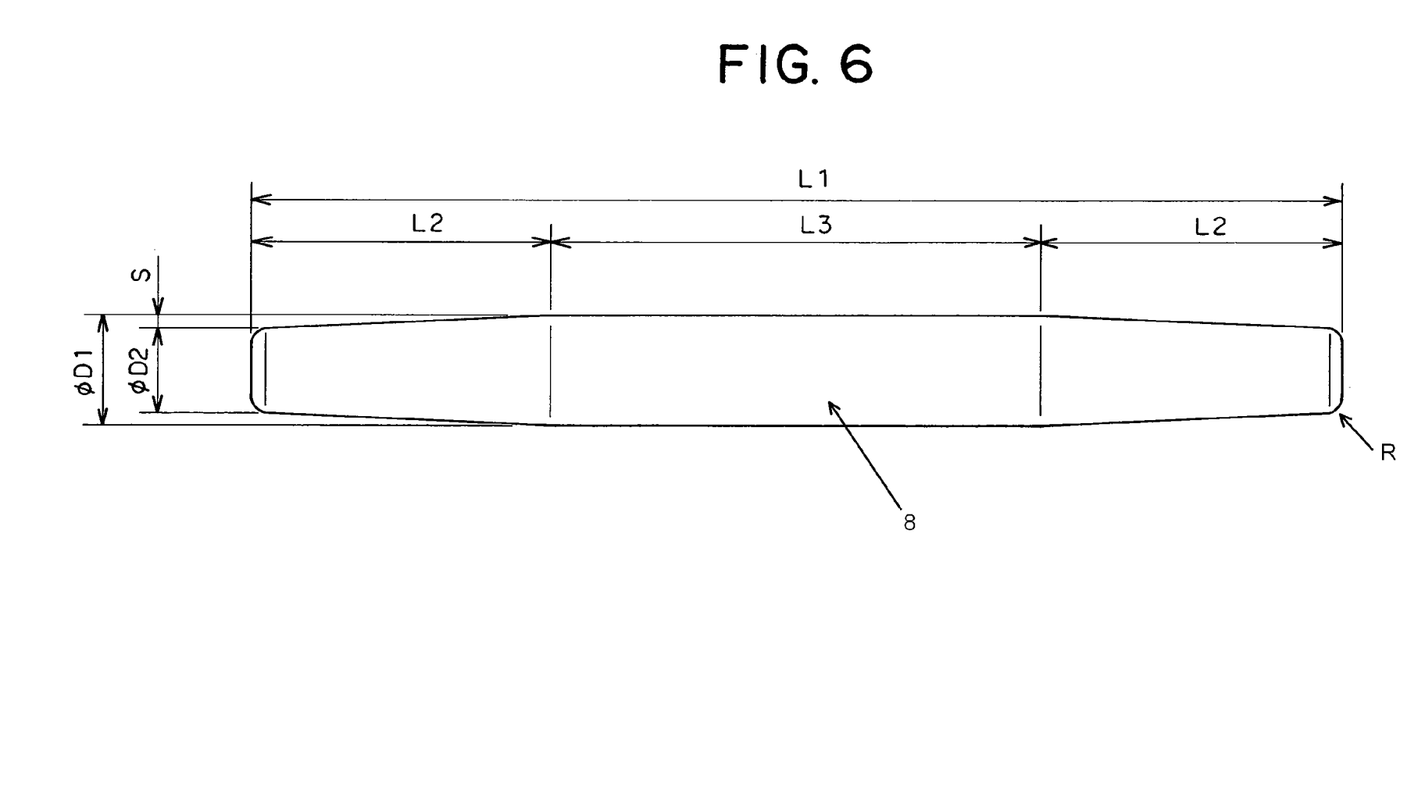
FIG. 6 is a side view of a cylindrical member (needle roller) according to the embodiment of the present invention.

Next, as shown in FIGS. 1 and 6, according to the present embodiment, the needle roller 8 is subjected to crowning. FIG. 6 is a side view of the cylindrical member (the needle roller) according to the embodiment of the present invention. A diameter of the needle roller 8 is gradually decreased toward the end portions from the central portion in the axial direction. A portion (φD1) having a largest diameter is the central portion, while a portion (φD2) having a smallest diameter is a portion proximal to the end face (but excluding a radiused portion (R) formed with the end face).

As shown in FIG. 6,

L1: an entire length of the needle roller,

L2: an axis-directional length subjected to the crowning,

L3: an axis-directional length of the maximum diameter portion,

φD1: a maximum diameter,

φD2: a minimum diameter, and

S: a difference quantity (a difference between the maximum diameter and the minimum diameter with respect to a radius), wherein a crowning dimensional relation be, it is desirable, set such that S=0.0003 mm through 0.500 mm and L2=L1×0.1 through L1×0.25.

Further, in the prior art, in the case of sliding the needle roller 8 while being brought into contact with the male shaft 1 and the female shaft 2, the gap between the male shaft 1, the needle roller 8 and the female shaft 2 must be strictly controlled especially in the positional difference in the axial direction.

For example, if exhibiting such a tendency that the inside diameter of the female shaft 2 is gradually decreased towards an inner part from the vicinity of an entrance, the male shaft 1 comes to have an extremely large slide resistance at a point of time when the end face of the needle roller 8 gains strong contact. If the entire gap is set large for avoiding this increase in the resistance, the periphery-directional backlash gets great.

By contrast, as in the present embodiment, the crowning portion enters a tapered portion of the female shaft 2 by effecting the crowning on the needle roller 8, and a longer slide stroke can be ensured while restraining the slide resistance low without any rise in the backlash in the peripheral direction.

Thus, according to the present embodiment, the needle roller 8 is subjected to the crowning and gradually decreases in its diameter toward the end portions from the central portion in the axial direction, whereby the needle rollers 8 of which the number is as small as possible can be disposed in one row of axis-directional grooves 4, 6. Accordingly, the assembling time can be decreased, and the needle roller can be manufactured at the low cost.

Further, the needle roller 8 is subjected to the crowning, and it is therefore possible to, as described above, reduce the backlash in the peripheral direction while restraining the slide resistance low.

Moreover, as the needle roller 8 is subjected to the crowning, when the torque is loaded, a gentle surface pressure is applied toward the central portion from the end portion of the needle roller 8. A local surface pressure can be thus avoided, so that a lifetime of the product can be kept long.

Note that the present invention is not limited to the embodiment discussed above and can be modified in a variety of forms.

As discussed above, according to the present invention, the cylindrical members of which the number is as small as possible can be disposed in one row of accommodating portions (the axis-directional grooves). Hence, the assembling time can be reduced, and the cylindrical member can be manufactured at the low cost.

Moreover, the torque transmission member is capable of decreasing the backlash in the peripheral direction while restraining the slide resistance low.

What is claimed is:

1. A telescopic shaft for vehicle steering which is assembled in a steering shaft of a vehicle and in which a male shaft and a female shaft are fitted for relative telescopic movement and for torque transmission therebetween, characterized in that:

a respective cylindrical member is disposed in at least one first set of accommodating portions being formed by a first pair of axially extending grooves formed respectively on an outer peripheral surface of said male shaft and on an inner peripheral surface of said female shaft, said cylindrical member having an axis that extends along an axial direction of said telescopic shaft, and said cylindrical member gradually decreasing in outer diameter from a central portion toward each of its end portions along the axial direction; and a respective rolling member is disposed in at least one second set of accommodating portions being formed by a second pair of axially extending grooves formed respectively on the outer peripheral surface of said male shaft and on the inner peripheral surface of said female shaft, said rolling member being radially biased.

2. A telescopic shaft for vehicle steering according to claim 1, wherein said cylindrical member is crowned.

3. A telescopic shaft for vehicle steering according to claim 1, wherein the outer diameter of said cylindrical member is tapered in a vicinity of each end portion of said cylindrical member.

4. A telescopic shaft for vehicle steering according to claim 1, wherein said cylindrical member is a needle roller.

5. A telescopic shaft for vehicle steering according to claim 1, wherein an axial length of said cylindrical member, between said central portion and an end portion over which said outer diameter gradually decreases, is between 0.1 and 0.25 times an overall axial length of said cylindrical member.

6. A telescopic shaft for vehicle steering which is assembled in a steering shaft of a vehicle and in which a male shaft and a female shaft are fitted for relative telescopic movement and for torque transmission therebetween, characterized in that:

a respective cylindrical member is disposed in at least one first set of accommodating portions being formed by a first pair of axially extending grooves formed respectively on an outer peripheral surface of said male shaft and on an inner peripheral surface of said female shaft, said cylindrical member having an axis that extends along an axial direction of said telescopic shaft, and said cylindrical member having frustoconical portions decreasing in outer diameter from a central portion of said cylindrical member toward each of its end portions, respectively, along the axial direction; and a respective rolling member is disposed in at least one second set of accommodating portions being formed by a second pair of axially extending grooves formed respectively on the outer peripheral surface of said male shaft and on the inner peripheral surface of said female shaft, said rolling member being radially biased.

7. A telescopic shaft for vehicle steering according to claim 6, wherein said end portions are radiused and each said frustoconical portion extends from said central portion to the corresponding end portion.

8. A telescopic shaft for vehicle steering according to claim 6, wherein said cylindrical member is crowned.

9. A telescopic shaft for vehicle steering according to claim 6, wherein the outer diameter of said cylindrical member is tapered in a vicinity of each end portion of said cylindrical member.

10. A telescopic shaft for vehicle steering according to claim 6, wherein said cylindrical member is a needle roller.

11. A telescopic shaft for vehicle steering according to claim 6, wherein an axial length of each frustoconical portion is between 0.1 and 0.25 times an overall axial length along said axis of said cylindrical member.

* * * * *